US012764307B2

(12) United States Patent
Buckner et al.

(10) Patent No.: US 12,764,307 B2
(45) Date of Patent: Oct. 13, 2026

(54) CIRCULAR IMAGE COMPRESSION

(71) Applicant: Apple Inc., Cupertino, CA (US)

(72) Inventors: Benjamin D. Buckner, Irvine, CA (US); Matthew J. Yaeger, Tustin, CA (US)

(73) Assignee: Apple Inc., Cupertino, CA (US)

( * ) Notice: Subject to any disclaimer, the term of this patent is extended or adjusted under 35 U.S.C. 154(b) by 427 days.

(21) Appl. No.: 18/242,355

(22) Filed: Sep. 5, 2023

(65) Prior Publication Data

US 2024/0080458 A1 Mar. 7, 2024

Related U.S. Application Data

(60) Provisional application No. 63/403,943, filed on Sep. 6, 2022.

(51) Int. Cl.
*H04N 19/167* (2014.01)

(52) U.S. Cl.
CPC .................................. *H04N 19/167* (2014.11)

(58) Field of Classification Search
CPC .................................................... H04N 19/167
USPC .......................................................... 382/239
See application file for complete search history.

(56) References Cited

U.S. PATENT DOCUMENTS

| | | | | |
|---|---|---|---|---|
| 6,118,454 | A * | 9/2000 | Oxaal | G06T 11/203 345/643 |
| 10,957,044 | B2 | 3/2021 | Van Der Auwera et al. | |
| 11,258,938 | B2 | 2/2022 | Lim et al. | |
| 2002/0141650 | A1* | 10/2002 | Keeney | H04N 19/198 382/250 |
| 2005/0094884 | A1* | 5/2005 | Takishima | H04N 1/41 382/243 |
| 2018/0075635 | A1* | 3/2018 | Choi | H04N 13/156 |
| 2020/0074587 | A1 | 3/2020 | Lee et al. | |

* cited by examiner

*Primary Examiner* — Gabriel I Garcia
(74) *Attorney, Agent, or Firm* — Fernando & Partners, LLP

(57) ABSTRACT

In one implementation, a method of compressing an image is performed at a device including one or more processors and non-transitory memory. The method includes obtaining an uncompressed image. The method includes compressing the uncompressed image to generate a compressed image by mapping a substantially circular portion of the uncompressed image to a substantially square portion of the compressed image, wherein a central region of the substantially circular portion of the uncompressed image is compressed more than a remainder of the substantially circular portion of the uncompressed image.

20 Claims, 6 Drawing Sheets

500

500

CIRCULAR IMAGE COMPRESSION

CROSS-REFERENCE TO RELATED APPLICATIONS

This application claims priority to U.S. Provisional Patent App. No. 63/403,943, filed on Sep. 6, 2022, which is hereby incorporated by reference in its entirety.

TECHNICAL FIELD

The present disclosure generally relates to systems, methods, and devices for compressing images.

BACKGROUND

Image compression reduces the cost of storage and/or transmission of digital images.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
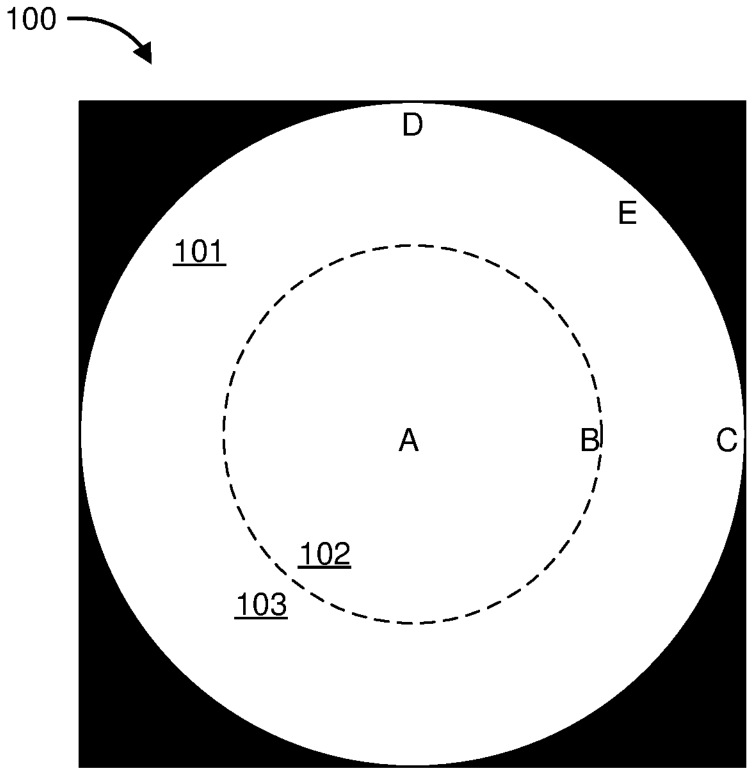
FIG. 1 illustrates an uncompressed image in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for compressing an image. In various implementations, the method is performed by a device including one or more processors and non-transitory memory. The method includes obtaining an uncompressed image. The method includes compressing the uncompressed image to generate a compressed image by mapping a substantially circular portion of the uncompressed image to a substantially square portion of the compressed image, wherein a central region of the substantially circular portion of the uncompressed image is compressed more than a remainder of the substantially circular portion of the uncompressed image.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

In various implementations, an image captured with an image sensor having a fisheye lens includes information only in a substantially circular region of the image. Such images may be referred to as circular images. Further, in various implementations, the radial resolution of circular images drops off as a function of distance from the center of the image. Image compression can reduce the cost of storage and/or transmission of such images. In various implementations, image compression can be lossless or lossy. Lossy image compression seeks to substantially reduce the size of the image while minimizing loss of visual fidelity. To that end, in various implementations, a substantially circular portion of an uncompressed image is mapped to a substantially square portion of an uncompressed image such that more pixels of the compressed image encode information. Further, a central region with high radial resolution is compressed more (e.g., downsampled more) than other regions with lower radial resolution. Lowering the resolution of the central region with high radial resolution introduces less visual difference than lowering the resolution of the other regions with lower resolution.

FIG. 1 illustrates an uncompressed image 100 according to some implementations. The uncompressed image 100 includes a rectangular matrix of pixels having respective pixel values. In various implementations, the uncompressed image 100 is captured in a physical environment using an image sensor having a fisheye lens. Accordingly, the uncompressed image 100 represents a large field-of-view of the physical environment. In various implementations, the fisheye lens focuses light from the physical environment onto a substantially circular region of the image sensor. Thus, whereas the uncompressed image 100 includes a rectangular matrix of pixels, only the pixel values of pixels in a substantially circular region 101 of the uncompressed image 100 represent the physical environment. Pixel values for pixels outside the substantially circular region 101 (illustrated in black) do not encode information and may represent noise or be set to zero.

Figure 2A:
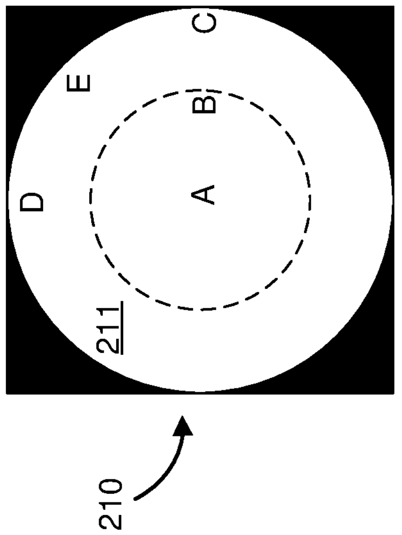
FIGS. 2A-2D illustrate various compressed versions of the uncompressed image of FIG. 1 in accordance with some implementations.

In various implementations, to compress the uncompressed image 100, the image 100 is uniformly downsampled. FIG. 2A illustrates a uniformly downsampled compressed image 210, a uniformly downsampled version of the image 100. The uniformly downsampled compressed image 210 includes a rectangular matrix of pixels having pixel values. In the uniformly downsampled compressed image 210, the substantially circular region 101 of the uncompressed image 100 is represented by a similar (but smaller) substantially circular region 211. Further, the uniformly downsampled compressed image 210 includes pixels outside the substantially circular region 211 having pixel values that do not encode information.

In various implementations, to compress the uncompressed image 100 and reduce the number of pixels having pixel values that do not encode information, a circle-to-square mapping is used to map the substantially circular region 101 of the uncompressed image 100 to a substantially square region of a compressed image. Various circle-to-square mappings may be used including radial stretching, Shirley-Chiu mapping, Fernandez-Guasti's squircle mapping, elliptical arc mapping, or conformal mapping.

Assuming an image is M×N, the normalized coordinates of a pixel in the image at a point (m, n) are (2m/M−1, −2n/N−1). Thus, the image spans from −1 to 1 both horizontally and vertically. Further, the radius of a pixel is the distance from the center of the image in the normalized coordinate system to the location of the pixel, or $$\sqrt{\left(\frac{2m}{M}-1\right)^2+\left(\frac{-2n}{N}-1\right)^2}.$$

The normalized radius of a pixel in the uncompressed image 100 is the radius of the pixel divided by the length of a line segment from the center of the substantially circular region 101 to its edge passing through the pixel. If the substantially circular region 101 is perfectly circular, the length of this line segment is invariably 1 and the normalized radius is equal to the radius. However, in various implementations, the substantially circular region is truncated (e.g., in FIG. 6 described below) and the normalized radius is not equal to the radius. The normalized radius of a pixel in a circle-to-square compressed image 100 is the radius of the pixel divided by the length of a line segment from the center of the substantially square region to its edge passing through the pixel. The length of this segment varies as a function of angle. For example, the length is 1 at 0 degrees and √2 at 45 degrees. In various implementations, the substantially square region has rounded corners (e.g., in FIG. 7 described below) and the normalized radius is less than √2 at 45 degrees.

To map a circle to a square using uniform radial stretching, the radius of each point in the circle is stretched (or scaled), based on its angle, in proportion to the distance at that angle from the center of the square to its edge. Thus, the normalized radius of a point in the compressed image is the same as the normalized radius of the point in the uncompressed image 100.

For example, where u and v are the normalized coordinates of the circle, x and y are the normalized coordinates of the square, and $r=\sqrt{u^2+v^2}$, $$(x, y) = \begin{cases} (0, 0) & \text{if } r = 0 \\ (\operatorname{sgn}(u)\cdot r, \operatorname{sgn}(v)\cdot rv/u) & \text{if } r > 0 \text{ and } u^2 \geq v^2 \\ (\operatorname{sgn}(u)\cdot ru/v, \operatorname{sgn}(v)\cdot r) & \text{if } r > 0 \text{ and } u^2 < v^2 \end{cases}$$

Figure 2B:
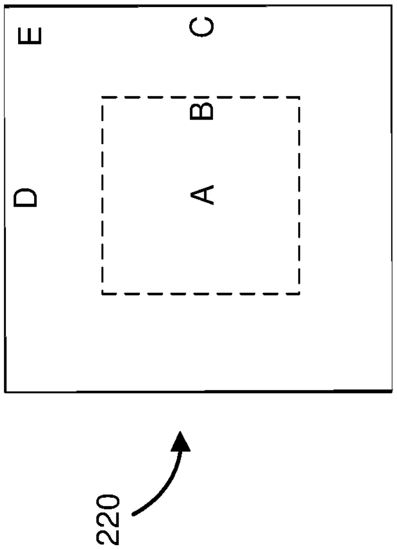

FIG. 2B illustrates a uniformly stretched square compressed image 220 formed by mapping the substantially circular region 101 of the uncompressed image to a square using uniform radial stretching. Thus, point A in the uncompressed image 100, having a radius of 0, is represented by point A in the uniformly stretched square compressed image 220 having a radius of 0. Point B in the uncompressed image 100, having a radius of approximately 0.5 and an angle of 0 degrees, is represented by point B in the uniformly stretched square compressed image 220, having a radius of approximately 0.5 and an angle of 0 degrees. Point C in the uncompressed image 100, having a radius of approximately 1 and an angle of 0 degrees, is represented by point C in the uniformly stretched square compressed image 220, having a radius of approximately 1 and an angle of 0 degrees. Point D in the uncompressed image 100, having a radius of approximately 1 and an angle of 90 degrees, is represented by point D in the uniformly stretched square compressed image 220, having a radius of approximately 1 and an angle of 90 degrees. Point E in the uncompressed image 100, having a radius of approximately 1 and an angle of 45 degrees, is represented by point E in the uniformly stretched square compressed image 220, having a radius of approximately √2 and an angle of 45 degrees (as compared to a radius of approximately 1 in the uniformly downsampled compressed image 210).

Figure 3A:
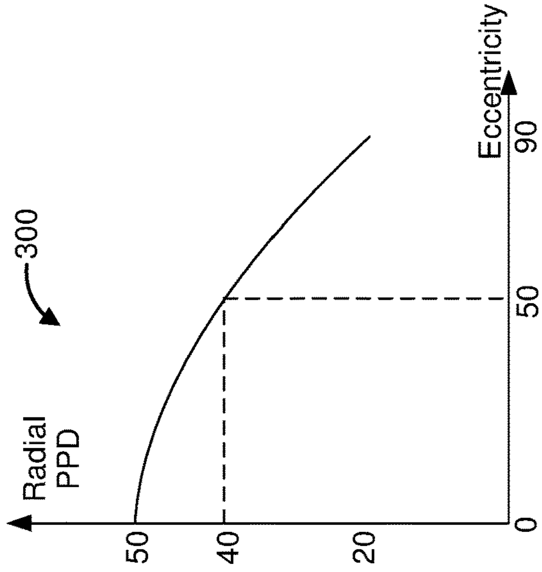
FIGS. 3A-3C illustrate various graphs of the resolution of various images of FIGS. 1 and 2A-2D in accordance with some implementations.

In various implementations, the radial resolution of an image captured using an image sensor having a fisheye lens is highest at the center of the image and decreases as the distance from the center increases. FIG. 3A illustrates a graph 300 of the radial resolution of the uncompressed image 100 as a function of eccentricity (degrees from center). The radial resolution is approximately 50 PPD (pixels per degree) at the center of the uncompressed image 100, decreases to approximately 40 PPD at approximately 50 degrees eccentricity, and further decreases to approximately 20 PPD at approximately 90 degrees eccentricity.

Figure 3B:
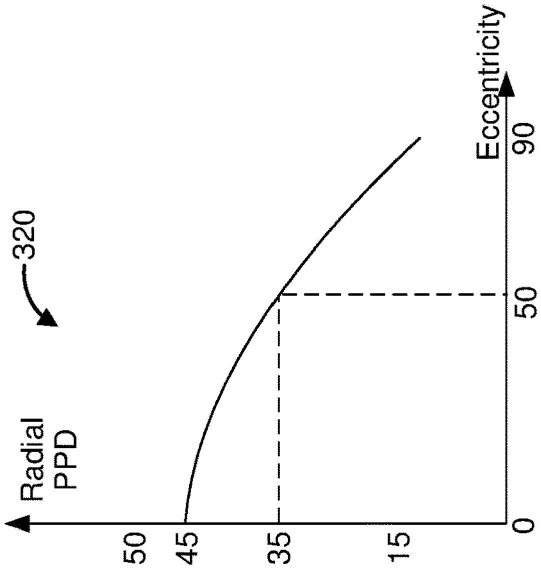

Thus, the center of the uncompressed image 100 encodes much more information than the outer region. Compressing the uncompressed image 100 using uniform radial stretching decreases the radial resolution uniformly. FIG. 3B illustrates a graph 320 of the radial resolution of the uniformly stretched square compressed image 220 as a function of eccentricity. The radial resolution is approximately 45 PPD (pixels per degree) at the center of the uniformly stretched square compressed image 220, decreases to approximately 35 PPD at approximately 50 degrees eccentricity, and further decreases to approximately 15 PPD at approximately 90 degrees eccentricity.

Thus, information at the outer region of the uncompressed image 100, already scant as compared to the center, is discarded in the uniformly stretched square compressed image. Further, in various implementations, a display may be limited as to the radial resolution that can be displayed. For example, in various implementations, a display can display up to 40 PPD. Thus, the information at the center of the uniformly stretched square compressed image 220 having a PPD greater than 45 PPD is undisplayable.

Thus, in various implementations, a nonuniform circle-to-square mapping is used in which a central region 102 of the substantially circular region 101 is compressed more than an outer region 103 including the remainder of the substantially circular region 101.

For example, where u and v are the normalized coordinates of the circle, x and y are the normalized coordinates of the square, $r=\sqrt{u^2+v^2}$, and $f(r)$ is a nonuniform stretching function, $$(x, y) = \begin{cases} (0, 0) & \text{if } r = 0 \\ (f(r)\cdot\operatorname{sgn}(u)\cdot r, f(r)\cdot\operatorname{sgn}(v)\cdot rv/u) & \text{if } r > 0 \text{ and } u^2 \geq v^2 \\ (f(r)\cdot\operatorname{sgn}(u)\cdot ru/v, f(r)\cdot\operatorname{sgn}(v)\cdot r) & \text{if } r > 0 \text{ and } u^2 < v^2 \end{cases}$$

Figure 4:
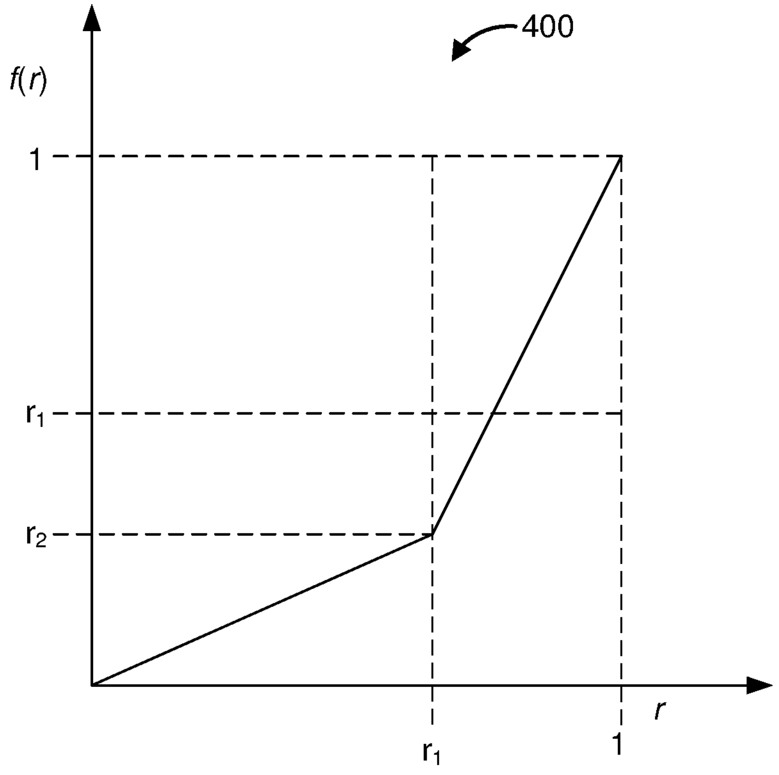
FIG. 4 illustrates a graph of a nonuniform stretching function in accordance with some implementations.

In various implementations, the nonuniform stretching function is convex. FIG. 4 illustrates a graph 400 of an example nonuniform stretching function. The nonuniform stretching function is linear between input values of 0 and a first value ($r_1$) having output values from 0 to a second value ($r_2$) less than the first value. The nonuniform stretching function is linear between input values of the first value and 1 having output values from the second value to 1. In various implementations, different nonuniform stretching functions are used for the horizontal and vertical components.

Figure 2C:
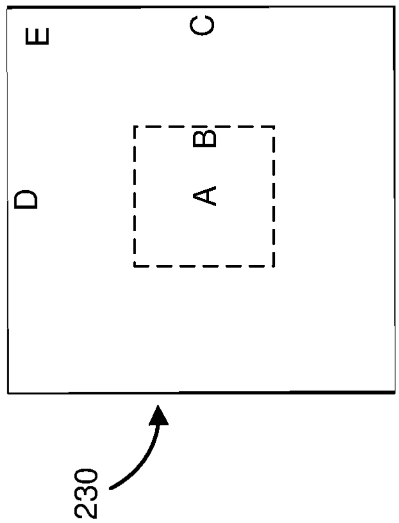

FIG. 2C illustrates a nonuniformly stretched square compressed image 230 formed by mapping the substantially circular region 101 of the uncompressed image to a square using nonuniform radial stretching. Thus, point A in the uncompressed image 100, having a radius of 0, is represented by point A in the nonuniformly stretched square compressed image 230 having a radius of 0. Point B in the uncompressed image 100, having a radius of approximately 0.5 and an angle of 0 degrees, is represented by point B in the nonuniformly stretched square compressed image 230, having a radius of approximately 0.25 and an angle of 0 degrees (as compared to a radius of approximately 0.5 in the uniformly stretched square compressed image 220). Point C in the uncompressed image 100, having a radius of approximately 1 and an angle of 0 degrees, is represented by point C in the nonuniformly stretched square compressed image 230, having a radius of approximately 1 and an angle of 0 degrees. Point D in the uncompressed image 100, having a radius of approximately 1 and an angle of 90 degrees, is represented by point D in the nonuniformly stretched square compressed image 230, having a radius of approximately 1 and an angle of 90 degrees. Point E in the uncompressed image 100, having a radius of approximately 1 and an angle of 45 degrees, is represented by point E in the nonuniformly stretched square compressed image 230, having a radius of approximately $\sqrt{2}$ and an angle of 45 degrees.

Figure 3C:
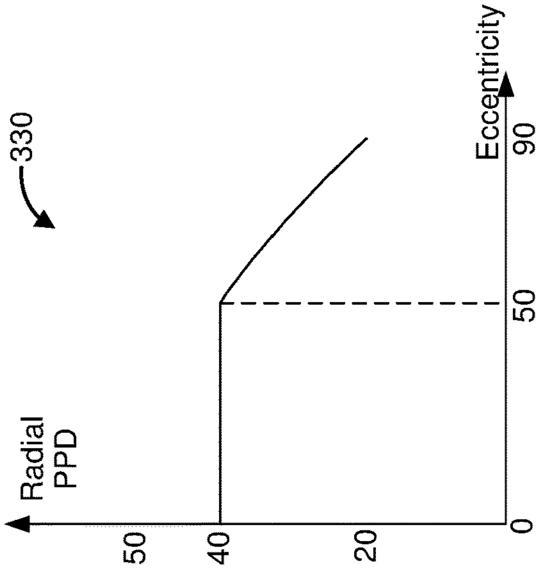

Through nonuniform stretching, the radial resolution of the central region can be capped (e.g., to a maximum display resolution) while maintaining the radial resolution of the outer region. FIG. 3C illustrates a graph 330 of the radial resolution of the nonuniformly stretched square compressed image 230 as a function of eccentricity. The radial resolution is approximately 40 PPD (pixels per degree) from the center of the nonuniformly stretched square compressed image 230 to approximately 50 degrees eccentricity, then, the radial resolution decreases to approximately 20 PPD at approximately 90 degrees eccentricity.

Figure 2D:
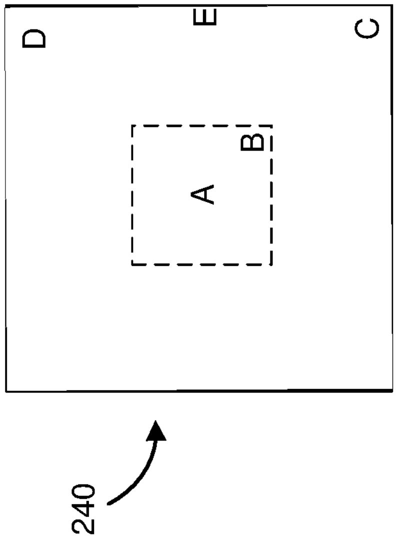

Because of the radial stretching, there are more pixels (and more information) along the diagonals than the equator and meridian in the nonuniformly stretched square compressed image 230. Accordingly, in various implementations, the substantially circular region 101 of the uncompressed image is rotated −45 degrees (or 45 degrees, 135 degrees, or −135 degrees) or before the mapping is applied to maintain as much information along the equator and meridian of the uncompressed image 100. In various implementations, the rotation is integrated into the mapping to form a rotated nonuniform circle-to-square mapping. FIG. 2D illustrates a rotated nonuniformly stretched square compressed image 240.

Thus, point A in the uncompressed image 100, having a radius of 0, is represented by point A in the rotated nonuniformly stretched square compressed image 240 having a radius of 0. Point B in the uncompressed image 100, having a radius of approximately 0.5 and an angle of 0 degrees, is represented by point B in the rotated nonuniformly stretched square compressed image 240, having a radius of approximately $(\sqrt{2})/4$ and an angle of −45 degrees. Point C in the uncompressed image 100, having a radius of approximately 1 and an angle of 0 degrees, is represented by point C in the rotated nonuniformly stretched square compressed image 240, having a radius of approximately $\sqrt{2}$ and an angle of −45 degrees. Point D in the uncompressed image 100, having a radius of approximately 1 and an angle of 90 degrees, is represented by point D in the rotated nonuniformly stretched square compressed image 240, having a radius of approximately $\sqrt{2}$ and an angle of 45 degrees. Point E in the uncompressed image 100, having a radius of approximately 1 and an angle of 45 degrees, is represented by point E in the rotated nonuniformly stretched square compressed image 240, having a radius of approximately 1 and an angle of 0 degrees.

In various implementations, a compressed image is provided to a player which decompresses the compressed image and displays the decompressed image. In various implementations, with the compressed image, the player is also provided a decompression mapping which used by the player to decompress the compressed image. In various implementations, the decompression making is provided to the player as a set of vertices on the unit sphere and corresponding pixel locations, forming a triangular mesh. Thus, in various implementations, the decompression mapping is a piecewise affine mapping, as an affine map is defined by three point pair correspondences. Accordingly, in various implementations, the compression mapping is also a piecewise affine map.

The circle-to-square mappings described above are neither affine nor piecewise affine. Accordingly, in various implementations, a piecewise affine mapping is defined in which each of a plurality of vertices in the uncompressed image 100 are mapped to corresponding vertices in the compressed image using one of the circle-to-square mappings described above. In various implementations, the vertices in the uncompressed image 100 is a substantially regular polygon mesh, such as the icosphere. Further, pixels of the uncompressed image 100 within a triangle defined by three vertices are mapped to corresponding pixel locations in the compressed image using the affine mapping defined by the three vertices. The corresponding vertices in the compressed image are provided to the player as part of the decompression mapping.

Figure 5:
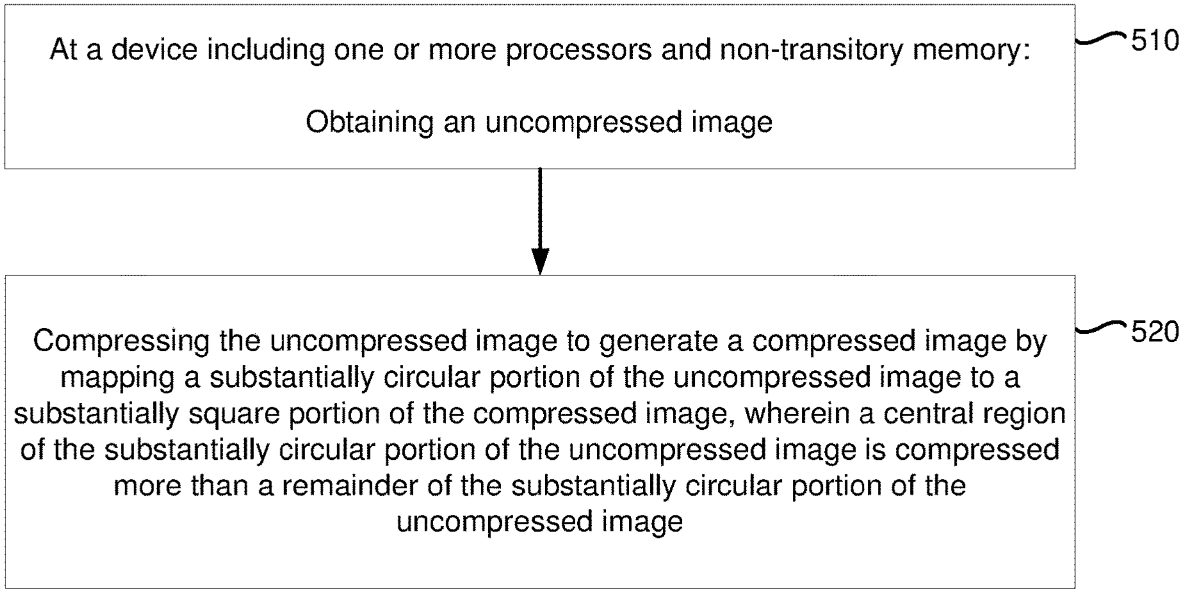
FIG. 5 illustrates a flowchart representation of a method of compressing an image in accordance with some implementations.

FIG. 5 is a flowchart representation of a method 500 of compressing an image in accordance with some implementations. In various implementations, the method 500 is performed by a device including one or more processors and non-transitory memory. In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

Figure 6:
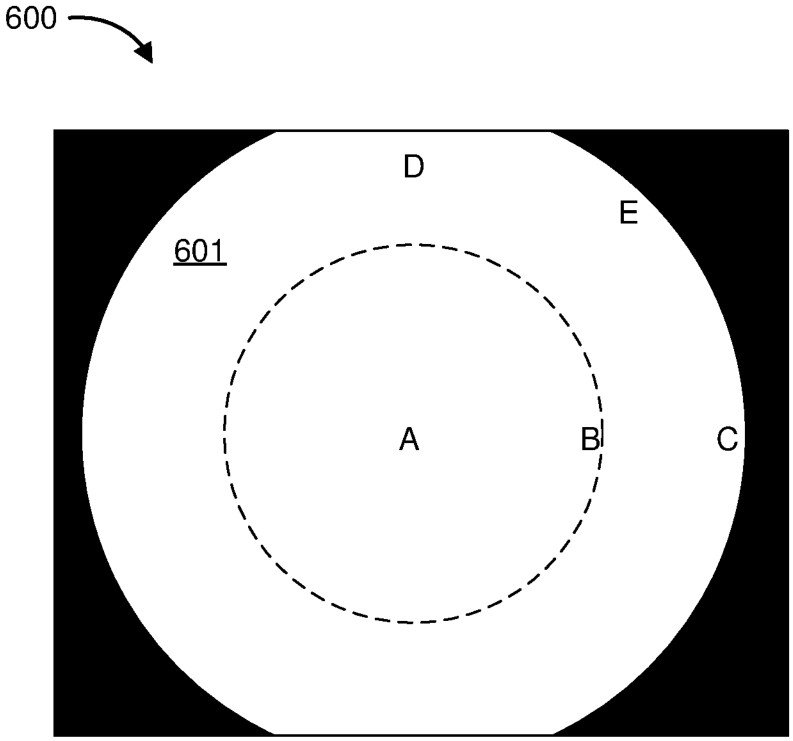
FIG. 6 illustrates a rectangular uncompressed image in accordance with some implementations.

The method 500 begins, in block 510, with the device obtaining an uncompressed image. In various implementations, obtaining the uncompressed image includes capturing, using an image sensor having a fisheye lens, an image of a physical environment. In various implementations, the uncompressed image is a rectangular matrix of pixels having respective pixel values. In various implementations, the uncompressed image includes a substantially circular portion including pixels having pixel values that encode information and the remainder of the pixels have pixel values that do not encode information. Although FIG. 1 illustrates the uncompressed image 100 as a square, in various implementations, the uncompressed image is a rectangle having a first dimension different than a second dimension. Further, although FIG. 1 illustrates the substantially circular portion 101 as a complete circle, in various implementations, the uncompressed image includes a substantially circular portion that is not perfectly circular, e.g., having a top and bottom portion clipped. For example, FIG. 6 illustrates a rectangular uncompressed image 600 including a substantially circular region 601 that is not a complete circle.

Figure 7:
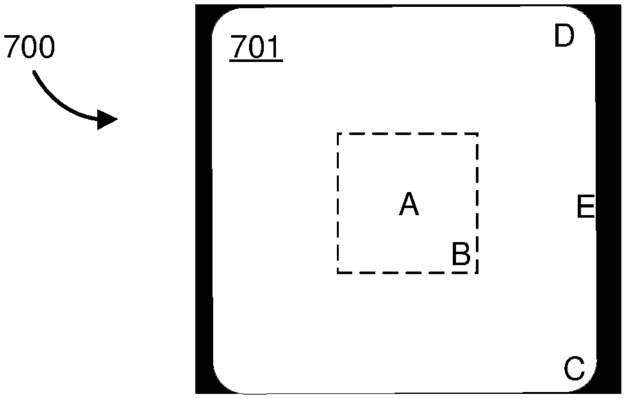
FIG. 7 illustrates a rectangular compressed image in accordance with some implementations.

The method 500 continues, in block 520, with the device compressing the uncompressed image to generate a compressed image by mapping a substantially circular portion of the uncompressed image to a substantially square portion of the compressed image. The compressed image is a matrix of pixels having respective pixel values. In various implementations, the compressed image is a square matrix of pixels. In various implementations, the compressed image includes fewer pixels than the uncompressed image. Although FIGS. 2B-2D illustrate a complete square region into which the substantially circularly region 101 is mapped, in various implementations, the compressed image includes a substantially square portion that is not perfectly square, e.g., by being a rectangle having a first dimension different than a second dimension or having rounded corners. For example, FIG. 7 illustrates a rectangular compressed image 700 including a substantially square region 701 that is not a perfect square.

In various implementations, a central region of the substantially circular portion of the uncompressed image is compressed more than a remainder of the substantially circular portion of the uncompressed image. For example, in FIG. 2C and FIG. 2D, the central region 102 of the substantially circular portion 101 of the uncompressed image 100 is compressed more than the outer region 103 in the nonuniformly stretched square compressed image 230 and the rotated nonuniformly stretched square compressed image 240.

In various implementations, mapping the substantially circular portion of the uncompressed image to a substantially square portion of the compressed image includes nonuniform radial stretching. Thus, in various implementations, a normalized radius of a particular pixel in the central region of the uncompressed image is greater than a normalized radius of a corresponding pixel in the compressed image. Similarly, in various implementations, a normalized radius of a particular pixel in the remainder of the substantially circular portion of the image is less than a normalized radius of a corresponding pixel in the compressed image.

In various implementations, the radial resolution of the uncompressed image decreases as a function of eccentricity. Thus, in various implementations, the radial resolution of the uncompressed image decreases from a maximum at the center of the uncompressed image as the normalized radius increases. In various implementations, each point in the compressed image has a radial resolution less than the maximum radial resolution of the uncompressed image. In various implementations, the maximum radial resolution of the compressed image is less than or equal to a display threshold, e.g., the maximum radial resolution displayable by a particular display. In various implementations, the radial resolution of the compressed image is substantially constant in a central region of the compressed image corresponding the central region of the substantially circular portion of the uncompressed image.

In various implementations, the horizontal radial resolution of the compressed image differs from the vertical radial resolution of the compressed image. For example, in various implementations, the vertical radial resolution (in the central region of the compressed image) is approximately 38 PPD and the horizontal radial resolution (in the central region of the compressed image) is approximately 36 PPD.

In various implementations, mapping the substantially circular portion of the uncompressed image to a substantially square portion of the compressed image includes mapping a plurality of vertices of the uncompressed image to corresponding vertices of the compressed image. Further, in various implementations, pixels of the uncompressed image within a triangle defined by three vertices are mapped to corresponding pixel locations in the compressed image using the affine mapping defined by the three vertices. Thus, in various implementations, mapping the substantially circular portion of the uncompressed image to a substantially square portion of the compressed image includes performing a piecewise affine mapping.

In various implementations, mapping the substantially circular portion of the uncompressed image to a substantially square portion of the compressed image includes additional mappings. For example, in various implementations, the uncompressed image is rotated prior to compression to increase the sampling along the equator and prime meridian. In various implementations, the rotation is incorporated into the mapping. Thus, in various implementations, in the compressed image, the substantially circular portion of the uncompressed image is rotated approximately 45 degrees, 135 degrees, 225 degrees, or 315 degrees.

In various implementations, the mapping includes image rectification (e.g., stereo image rectification). In various implementations, a camera includes two or more image sensors which generate a set of two or more images. Due to camera misalignment, lens distortion, or other factors, the images may be vertically offset. Image rectification projects the images onto a common image plane in such a way that the corresponding points in the images have the same row coordinates. Image rectification is a projection (or mapping) that corrects the images to appear as if the two or more image sensors are parallel. It may be particularly beneficial to perform image rectification before compression to increase the efficiency of the encoding stage with an encoding that uses interframe similarity, e.g., block matching, motion vector prediction and bundling, etc.

In various implementations, the mapping includes lens distortion correction, perspective correction, or any other projection or mapping.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device having one or more processors and non-transitory memory;

obtaining an uncompressed image; and compressing the uncompressed image to generate a compressed image by mapping a portion of the uncompressed image having a first shape to a portion of the compressed image having a second shape different than the first shape, wherein a central first region of the portion of the uncompressed image including pixels having a normalized radius less than a first value is compressed more than a second region of the portion of the uncompressed image including pixels having a normalized radius greater than the first value.

2. The method of claim 1, wherein obtaining the uncompressed image includes capturing, using an image sensor having a fisheye lens, an image of a physical environment.

3. The method of claim 1, wherein, in the compressed image, the portion of the uncompressed image is rotated approximately 45 degrees, 135 degrees, 225 degrees, or 315 degrees.

4. The method of claim 1, wherein mapping the portion of the uncompressed image to the portion of the compressed image includes nonuniform radial stretching.

5. The method of claim 1, wherein a normalized radius of a particular pixel in the first region of the uncompressed image is greater than a normalized radius of a corresponding pixel in the compressed image.

6. The method of claim 1, wherein a normalized radius of a particular pixel in the second region of the uncompressed image is less than a normalized radius of a corresponding pixel in the compressed image.

7. The method of claim 1, wherein a maximum radial resolution of the compressed image is less than or equal to a display threshold.

8. The method of claim 1, wherein mapping the portion of the uncompressed image to the portion of the compressed image includes:

mapping a plurality of vertices of the uncompressed image to corresponding vertices of the compressed image; and mapping pixels of the uncompressed image within a triangle defined by three vertices to corresponding pixel locations in the compressed image using an affine mapping defined by the three vertices.

9. The method of claim 1, wherein mapping the portion of the uncompressed image to the portion of the compressed image includes performing a piecewise affine mapping.

10. The method of claim 1, wherein mapping the portion of the uncompressed image to the portion of the compressed image includes performing stereo image rectification.

11. The method of claim 1, wherein the compressed image includes fewer pixels than the uncompressed image.

12. A device comprising:

a non-transitory memory; and one or more processors to:

obtain an uncompressed image; and compress the uncompressed image to generate a compressed image by mapping a portion of the uncompressed image having a first shape to a portion of the compressed image having a second shape, wherein a first region of the portion of the uncompressed image including pixels having a normalized radius less than a first value is compressed more than a second region of the portion of the uncompressed image including pixels having a normalized radius greater than the first value.

13. The device of claim 12, wherein the one or more processors are to obtain the uncompressed image by capturing, using an image sensor having a fisheye lens, an image of a physical environment.

14. The device of claim 12, wherein, in the compressed image, the portion of the uncompressed image is rotated approximately 45 degrees, 135 degrees, 225 degrees, or 315 degrees.

15. The device of claim 12, wherein mapping the portion of the uncompressed image to the portion of the compressed image includes nonuniform radial stretching.

16. The device of claim 12, wherein a normalized radius of a particular pixel in the first region of the uncompressed image is greater than a normalized radius of a corresponding pixel in the compressed image.

17. The device of claim 12, wherein a normalized radius of a particular pixel in the second region of the uncompressed image is less than a normalized radius of a corresponding pixel in the compressed image.

18. The device of claim 12, wherein mapping the portion of the uncompressed image to the portion of the compressed image includes:

mapping a plurality of vertices of the uncompressed image to corresponding vertices of the compressed image; and mapping pixels of the uncompressed image within a triangle defined by three vertices to corresponding pixel locations in the compressed image using an affine mapping defined by the three vertices.

19. The device of claim 12, wherein mapping the portion of the uncompressed image to the portion of the compressed image includes performing a piecewise affine mapping.

20. A non-transitory memory storing one or more programs, which, when executed by one or more processors of a device, cause the device to:

obtain an uncompressed image; and compress the uncompressed image to generate a compressed image by mapping a portion of the uncompressed image having a first shape to a portion of the compressed image having a second shape, wherein a first region of the portion of the uncompressed image including pixels having a normalized radius less than a first value is compressed more than a second region of the portion of the uncompressed image including pixels having a normalized radius greater than the first value.

* * * * *